A. KNISTROM.
CLUTCH MECHANISM.
APPLICATION FILED DEC. 17, 1910.
1,183,384.
Patented May 16, 1916.
5 SHEETS—SHEET 2.
Fig. 2,
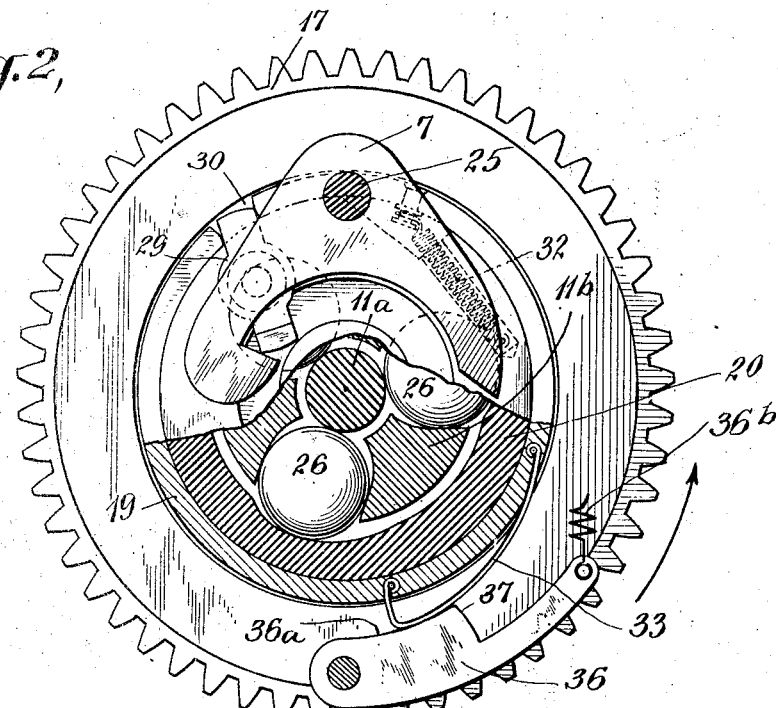
Fig. 3,
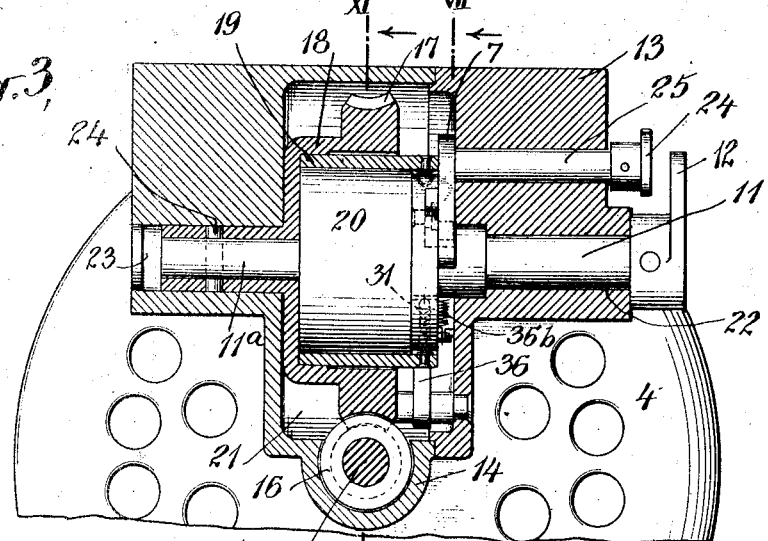
WITNESSES:
INVENTOR
August Knistrom
BY
Kerr Page Cooper & Hayward
ATTORNEYS A. KNISTROM.
CLUTCH MECHANISM.
APPLICATION FILED DEC. 17, 1910.
1,183,384.
Patented May 16, 1916.
5 SHEETS—SHEET 3.
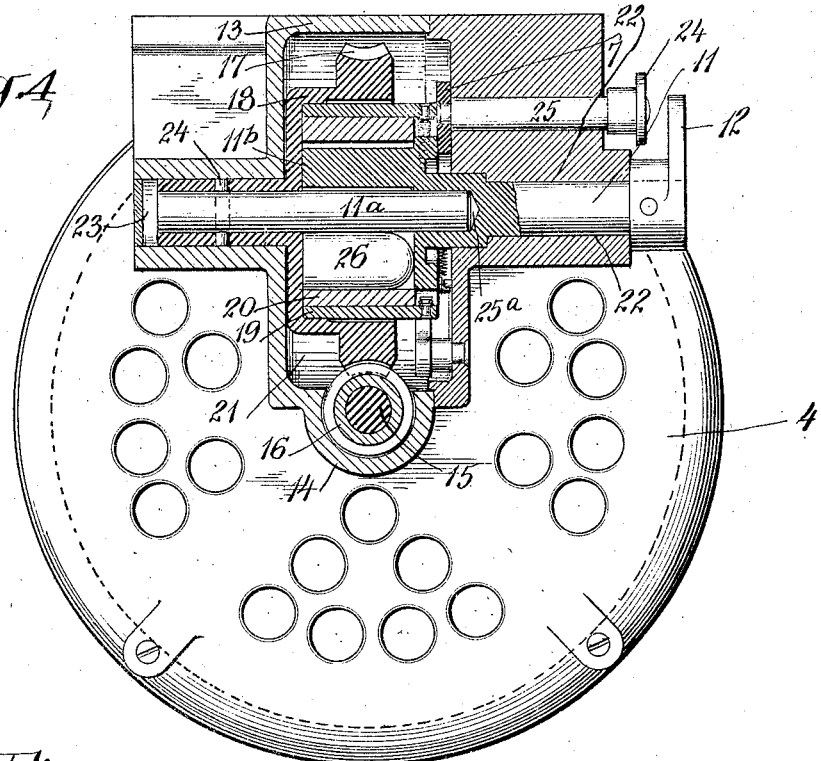
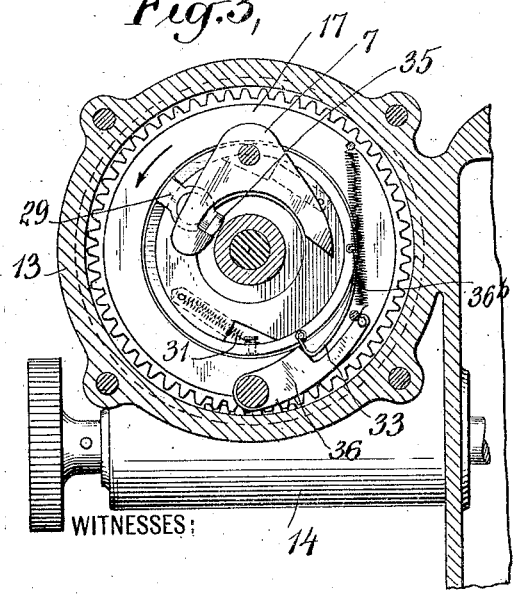
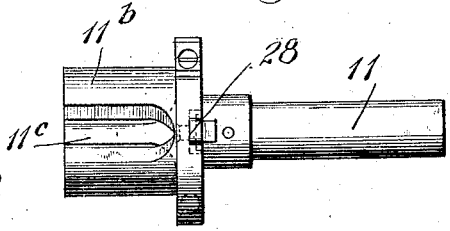
INVENTOR
August Knistrom
BY
Kerr Page Cooper & Hayward
ATTORNEYS

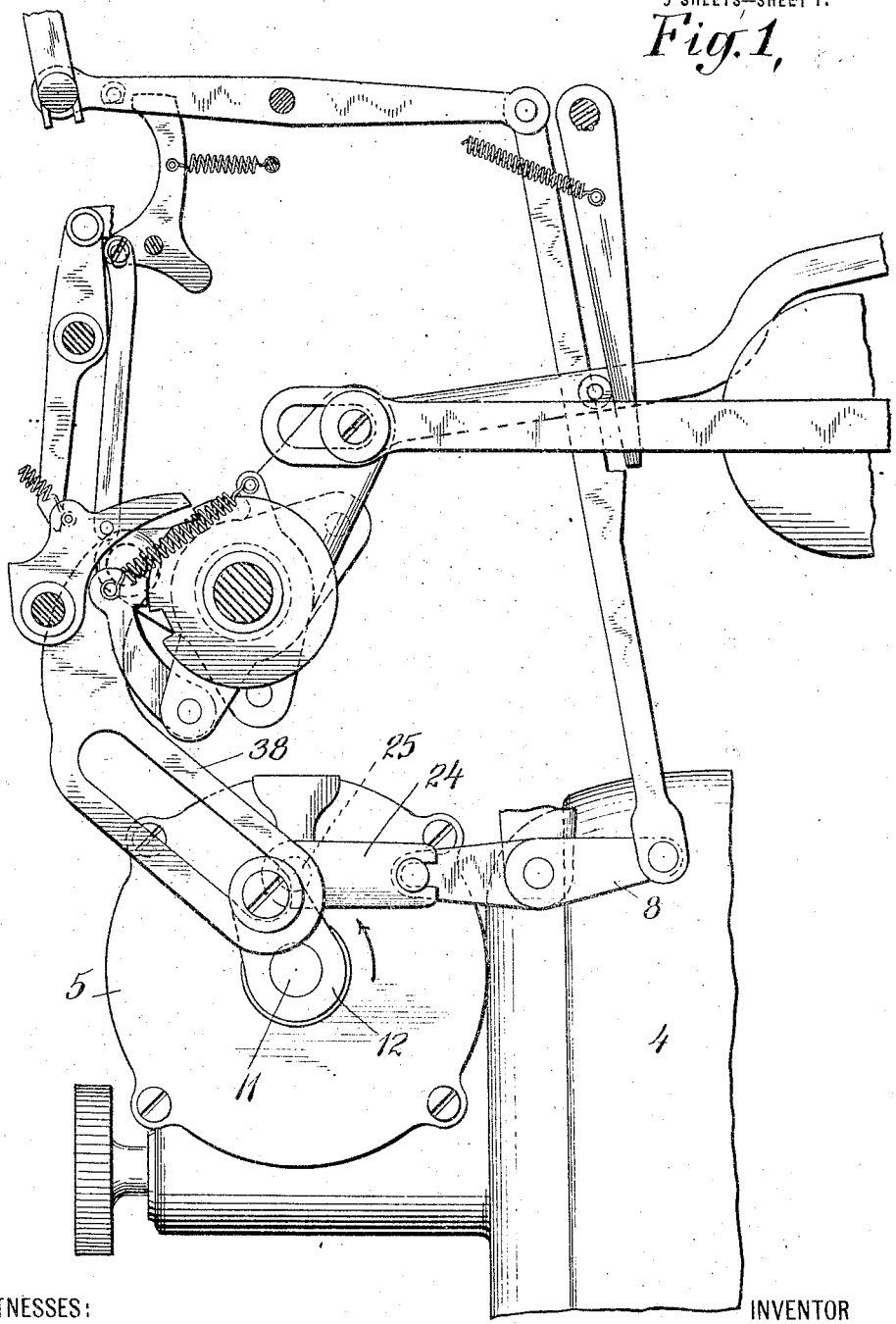

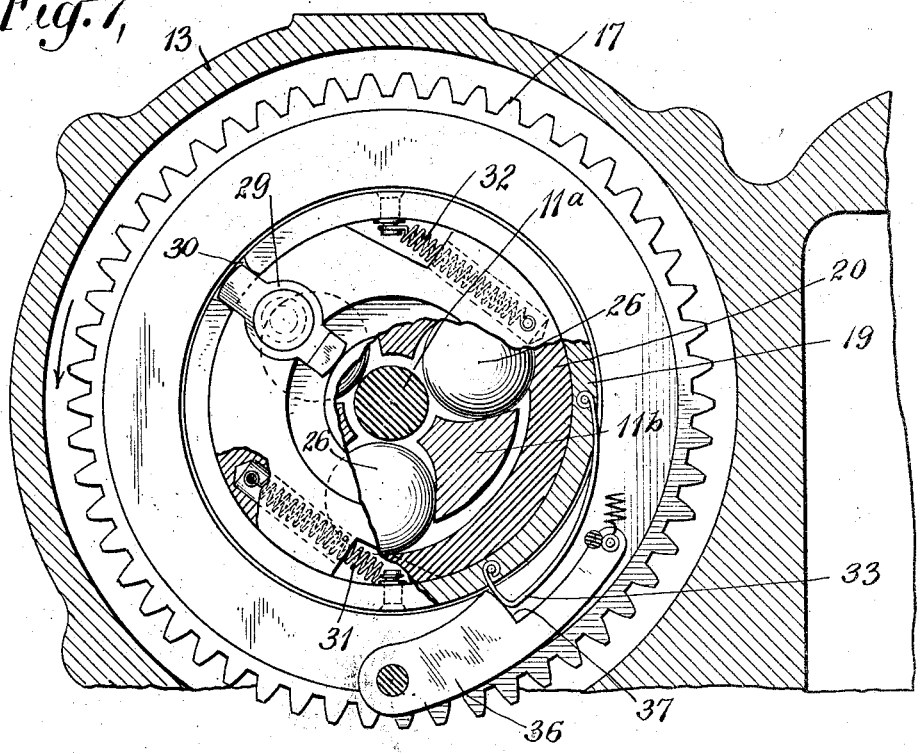
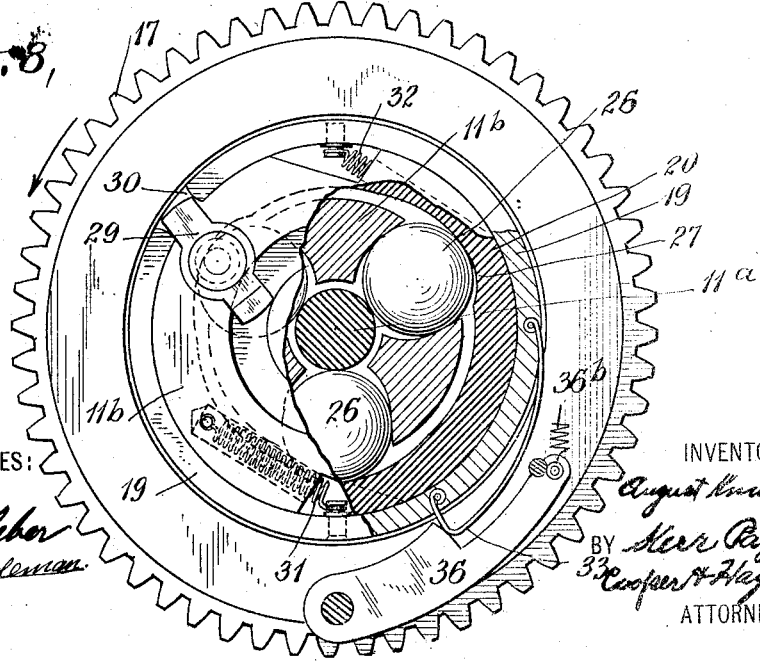

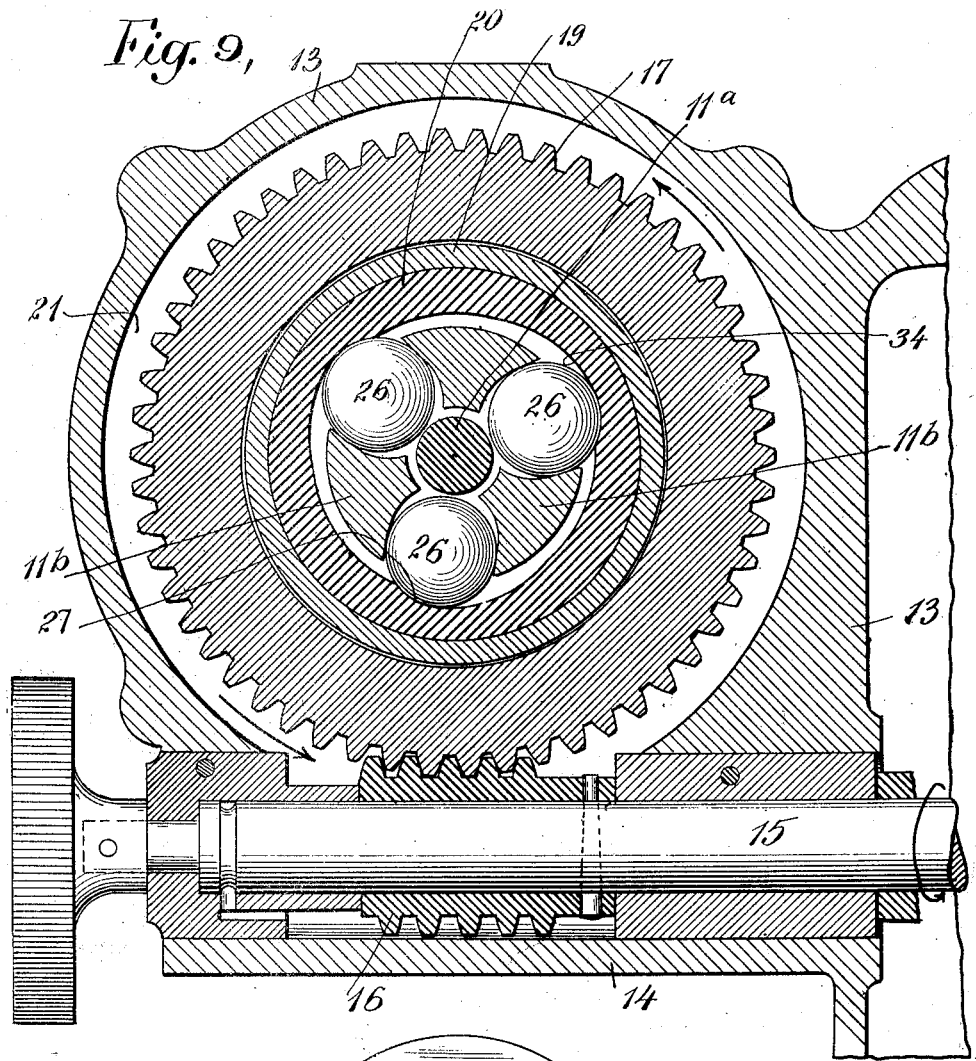
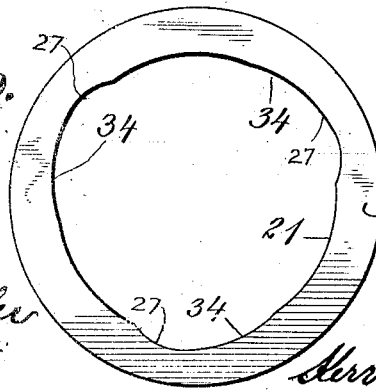

UNITED STATES PATENT OFFICE.

AUGUST KNISTROM, OF BINGHAMTON, NEW YORK.

CLUTCH MECHANISM.

1,183,384.

Specification of Letters Patent.

Patented May 16, 1916.

Application filed December 17, 1910. Serial No. 597,740.

*To all whom it may concern:*

Be it known that I, AUGUST KNISTROM, a subject of the King of Sweden, residing at Binghamton, in the county of Broome and State of New York, have invented certain new and useful Improvements in Clutch Mechanism, of which the following is a full, clear, and exact description.

The invention which constitutes the subject-matter of this application relates to a clutch designed particularly for use in adding machines which is actuated by a suitable motor as distinguished from being manually operated. The adding machine itself comprises mechanism in which the items or amounts are set up by the actuation of finger keys, while the operation of printing the items, effecting the desired addition or subtraction, and printing the total or result are performed by the machine. As a result the printing and calculating operations can be effected with the greatest possible rapidity, so rapidly, in fact, that the capacity of the machine shall be practically limited only by the skill of the operator in setting up the items.

Another object is to provide an apparatus in which the power of the motor shall be applied instantly upon the mere release or actuation of a controlling button or equivalent device by the operator and shall be automatically cut off at the conclusion of each cycle of operation.

In carrying out my invention in the preferred manner, I provide a motor, preferably electric, which is arranged to run continuously while the machine is in use. Between the motor shaft and power shaft of the machine I provide the clutch, with means controlled by the operator for throwing the same into action at will. The clutch also includes mechanism whereby it is automatically thrown out of action practically instantaneously at the end of the cycle of operations for which the motor furnishes the power. Thus the only act to be performed by the operator besides setting up the items is to throw the clutch into action, effected in the preferred embodiment by a slight pressure on a bar or arm conveniently located. The printing, adding, or other operation is then instantly done by the machine, driven by the motor, by the time the operator has noted the next item which is to be set up, so that no delay whatever is occasioned by the mechanical operations.

The embodiment thus briefly outlined is illustrated in the annexed drawings, in which—

Figure 1 shows the specific connection between the clutch shaft and the power shaft. Also shows the tripping mechanism for the clutch. Fig. 2 is an end view of the clutch mechanism removed from its casing. Fig. 3 is a cross sectional view of the clutch casing and mechanism. Fig. 4 is a view similar to Fig. 3, showing the clutch rim and driven shaft sectioned. Fig. 5 is a section on line VII—VII of Fig. 3 looking in the direction of the arrows and shows the parts in normal position. Fig. 6 shows the driven shaft removed from the casing. Fig. 7 shows another end view of the clutch casing and mechanism, the parts being in normal position. Fig. 8 shows another end view of the clutch mechanism, which is broken away in part to show the construction of parts. Fig. 9 is a view on line XI—XI of Fig. 3 looking in the direction of the arrows. Fig. 10 shows the clutch cylinder removed from the clutch casing.

Referring to the drawings, the numeral 4 designates a motor to which the clutch 5 is connected. The motor is suspended from a suitable frame (not shown) and when it is desired to throw the clutch into action the operator depresses a suitable bar or plunger (not shown) arranged near the item or set up keys. The clutch mechanism is normally held in inoperative position by means of a stop or hook 7 (see Fig. 2). This stop is fixedly secured to a shaft 25 which is mounted in the clutch casing. The outer end of this shaft is provided with a crank arm 24 and the latter is suitably connected to the clutch controlling key not shown, so that depression of the latter by the pressure of the operator's finger or hand will raise the stop 7 and release the clutch. When the clutch or driven shaft 11 and crank arm 12 have made one revolution, mechanism hereinafter described comes into play and disconnects the clutch elements from each other, while the stop 7, previously restored to its normal position, again engages the clutch mechanism. The parts are thus restored to their initial positions, ready for another actuation of the clutch controlling key.

To the crank arm 12 of the clutch shaft 11 an arm 38 is connected. The arm 38 is provided with a pin and slot connection with the crank arm, which permits a movement of said arm without necessarily moving the crank arm.

The reference numeral 13 designates the clutch casing, circular in form, provided with a housing 14 into which extends the armature shaft 15 of the motor 4. The armature shaft carries a worm or endless screw 16, which meshes with a worm-gear 17 inside the clutch casing. The worm gear is rigidly fastened to a disk 18 which has a rotatable connection with the driven shaft 11 which is arranged at right angles to the armature shaft 15; so that the motor can be continuously driven, and with it the worm gear and its carrying disk, without imparting motion to the clutch shaft until the latter is connected with the disk by the clutch elements now to be described.

The clutch casing 13 has a cylindrical interior 21 in which the clutch mechanism is housed. Projecting centrally from such interior are openings 22, 23 which serve as bearings for the driven shaft 11 and the driving shaft 11ᵃ. The disk 18 is fixed upon the shaft 11ᵃ by means of a pin 24. Within the disk 18 there is provided a hollow cylinder 19 loosely fitting the disk 18 so that the latter may rotate without rotating the cylinder. Within the hollow cylinder 19 is a clutch ring 20 clearly shown in Fig. 10, and having a smooth outer surface. This clutch ring 20 is preferably made of tool steel, and the cylinder 19 is made of machinery steel so that the former can be forced into the latter in order to prevent any relative movement of these two elements. The ring 20 has an irregular inner surface comprising shallow pockets 27 which are adjacent the gradual inclines 34 (see Fig. 10). Projecting from the shaft 11 into the interior of the ring 20 are the prongs 11ᵇ, three in number, constituting a part of shaft 11, with intervening spaces 11ᶜ, as clearly shown in Fig. 6. The interior thereof is hollowed out to receive the shaft 11ᵃ. Shaft 11 is also provided with a socket 25ᵃ in which the shaft 11ᵃ is adapted to enter thereby allowing said shaft 11ᵃ to extend entirely through said cylindrical space, the socket being in fact only an extension of the hollow portion between the prongs above referred to. Located between the prongs and clutch ring and movable therewith are clutch elements 26, the latter normally resting in the shallow pockets 27 of the clutch ring in which position they have no binding action. Pivoted at 28 (see Fig. 6) on the driven shaft 11 is a two-arm lever 29 one of the arms of which enters a socket or space 30 in the cylindrical ring 19 and the other arm 35 Fig. 5 of which is adapted to be engaged by the stop lever 7. When the arm is held in the normal position, by the stop 7, which position is shown in Figs. 7 and 9, the resilient means 31 and 32 fastened at one of their ends to the hollow cylinder 19 and at the other to the driven shaft will tend to rotate these two members in opposite directions. So when the stop 7 is caused to release the arm 29 the shaft 11 with its prongs are caused by the springs 31 and 32 to rotate it being observed that the movement of hollow cylinder 19 and clutch ring 20 are locked against the tension of the springs by means of a stop 33 conveniently located on the cylinder 19. This causes the clutch elements to ride up the gradual incline 34 (see Fig. 10) of the clutch ring 20 and cause a binding action between said ring and the shaft 11ᵃ it being remembered that this shaft is continuously driven from the motor 4 and that the clutch ring 20 and the cylindrical ring 19 rotate as a unit. After releasing the clutch controlling key (not shown) to which the stop 7 is connected it immediately assumes the position shown, for example, in Fig. 5, ready to catch the projection 35 on the arm when the same makes a complete revolution. This is due to spring actuated or other mechanism not fully shown. Just before making the complete revolution the incline 36ᵃ of the locking arm 36 rides upon the stop 33 thereby overcoming the momentum of the hollow cylinder 19, the part 37 finally dropping behind the stop 33 to prevent fluttering of the clutch mechanism so frequently heard in devices of this kind, this dropping, as well as the brake action of the lock 36, being caused by the resilient means 36ᵇ being attached to one end thereof and the other end of said resilient means being attached to the interior of the clutch casing.

Briefly the operation of my improved clutch is as follows: The latch 7 is released from arm 35 of lever 29. This permits the lever 29 to rock and allows a relative rotation between the driven shaft 11 and hollow cylinder 19, and clutch ring 20. The clutch elements 26 are carried from pockets 27 into contact with the inclines 34 of the clutch ring 20 and are thereby crowded into engagement with driving shaft 11ᵃ. Thereafter, the driving shaft 11ᵃ and driven shaft 11 rotate in unison for a complete revolution until the latch 7 intercepts the arm on lever 29 and imparts a relative movement between the driven shaft 11 and the clutch ring 20. This relative movement carries the clutch elements 26 back into pockets 27 in the ring 20 and disengages them from driving shaft 11ᵃ whereby the driving and driven shafts are declutched.

The spring abutment coöperates with the stop 36 to overcome the momentum of parts 19 and 20 and also prevents chattering of the clutch parts.

It is to be understood of course that the apparatus herein specifically described is merely the preferred embodiment of the invention, which may be embodied in other forms without departure from its proper scope as defined by the appended claims.

What is claimed is as follows:

1. A clutch comprising, in combination, a driving shaft, clutch elements surrounding and adapted to contact with said driving shaft, a driven shaft upon which the clutch elements are carried, a disk on said driving shaft telescoping over the clutch elements and the end of said driven shaft, and means comprising a clutch ring interposed between the disk and clutch elements for effecting a frictional engagement between the clutch elements and the driving shaft.

2. A clutch comprising combination clutch elements, a driven shaft having means thereon to coöperate with said elements, a driving shaft extending through the clutch elements, clutch means surrounding said clutch elements and means for effecting a movement of the clutch elements and clutch means relative to each other whereby the clutch elements clutch the driving shaft and the driven shaft together.

3. A clutch comprising a driving shaft provided with a disk and a driven shaft provided with means for carrying clutch elements, said means telescoping into said disk, clutch ring means interposed between said disk and the aforesaid means adapted to cause the clutch elements on the driven shaft to frictionally engage the driving shaft, and means for effecting a relative movement between said clutching means and the driven shaft to cause said clutching elements on the driven shaft to engage the driving shaft.

4. A clutch comprising a driving shaft provided with an annular disk and a driven shaft provided with means which telescopes into said annular disk and which is adapted to carry one or more clutch elements, a clutch ring loosely interposed between the annular disk and the aforesaid means and adapted to contact with said clutch elements, and provided with inclined surfaces corresponding in number to the number of clutch elements, and means for causing a relative movement between the clutch ring and the driven shaft whereby the clutch elements are moved inwardly into frictional contact with said driving shaft.

5. A clutch comprising a driving shaft provided with an annular disk and a driven shaft provided with means which telescope into said annular disk and which is adapted to carry clutch elements, and means for moving said clutch elements radially inward with respect to and in contact with the driving shaft to clutch the latter with the driven shaft.

6. A clutch comprising a driving shaft provided with a disk or annular flange and a driven shaft provided with means for carrying clutch elements which telescopes into said disk or annular flange, an annular clutch member interposed between the annular flange and the aforesaid means, said member having means thereon to cam the clutch elements, and means for effecting a relative movement between the annular clutch member and the aforesaid means for causing the clutch elements to frictionally engage the driving shaft whereby motion will be imparted to the driven shaft.

In testimony whereof I affix my signature in the presence of two subscribing witnesses.

AUGUST KNISTROM.

Witnesses:
L. F. GIBLIN,
M. M. BOLAND.